(12) United States Patent
Toksvig et al.

(10) Patent No.: US 7,593,018 B1
(45) Date of Patent: Sep. 22, 2009

(54) METHOD AND APPARATUS FOR PROVIDING EXPLICIT WEIGHTS FOR TEXTURE FILTERING

(75) Inventors: Michael J. M. Toksvig, Palo Alto, CA (US); Walter E. Donovan, Saratoga, CA (US)

(73) Assignee: NVIDIA Corp., Santa Clara, CA (US)

( * ) Notice: Subject to any disclaimer, the term of this patent is extended or adjusted under 35 U.S.C. 154(b) by 673 days.

(21) Appl. No.: 11/300,811

(22) Filed: Dec. 14, 2005

(51) Int. Cl.
*G09G 5/00* (2006.01)
*G06K 9/00* (2006.01)
(52) U.S. Cl. ...................... 345/582; 382/108
(58) Field of Classification Search ................. 382/100, 382/108, 168, 181, 194, 232, 254, 274, 275, 382/276, 285, 303, 220, 260; 345/586, 427, 345/506, 419, 582
See application file for complete search history.

(56) References Cited

U.S. PATENT DOCUMENTS

| 6,181,347 | B1 * | 1/2001 | Devic et al. ................. 345/586 |
| 6,717,576 | B1 * | 4/2004 | Duluk et al. ................. 345/419 |
| 7,133,041 | B2 * | 11/2006 | Kaufman et al. ............ 345/419 |
| 7,148,890 | B2 * | 12/2006 | Rice et al. ................... 345/427 |
| 7,167,181 | B2 * | 1/2007 | Duluk et al. ................. 345/506 |
| 7,274,373 | B1 * | 9/2007 | Bastos et al. ................ 345/586 |

\* cited by examiner

*Primary Examiner*—Seyed Azarian
(74) *Attorney, Agent, or Firm*—Patterson & Sheridan, LLP (57) ABSTRACT

A system and method for providing explicit weights for texture filtering permits filter weights to vary for each pixel within a primitive. A different filter kernel may be used for each pixel. The weights may be computed or read from a texture map. Because the weights are explicit, the fractional portions of the texture map coordinates that are typically used to determine a bilinearly filtered texel are not used.

20 Claims, 7 Drawing Sheets

PRIOR ART

FIG. 1A

PRIOR ART

METHOD AND APPARATUS FOR PROVIDING EXPLICIT WEIGHTS FOR TEXTURE FILTERING

BACKGROUND OF THE INVENTION

1. Field of the Invention

Embodiments of the present invention generally relate computer graphics, and more particularly to providing filter weights for use in filtering texture map data.

2. Description of the Related Art

Conventional graphics processors are exemplified by systems and methods developed to read and filter texture map samples. Conventionally, texture coordinates, such as u, v, and p are represented in a fixed point format and are used to determine indices to access texels within a texture map. The integer portion of the texture coordinates are used to read four texels, a texel quad, and the four texels are filtered based on the fractional portions of the texture coordinates to produce a bilinearly filtered texel corresponding to the texture coordinates.

Figure 1A:
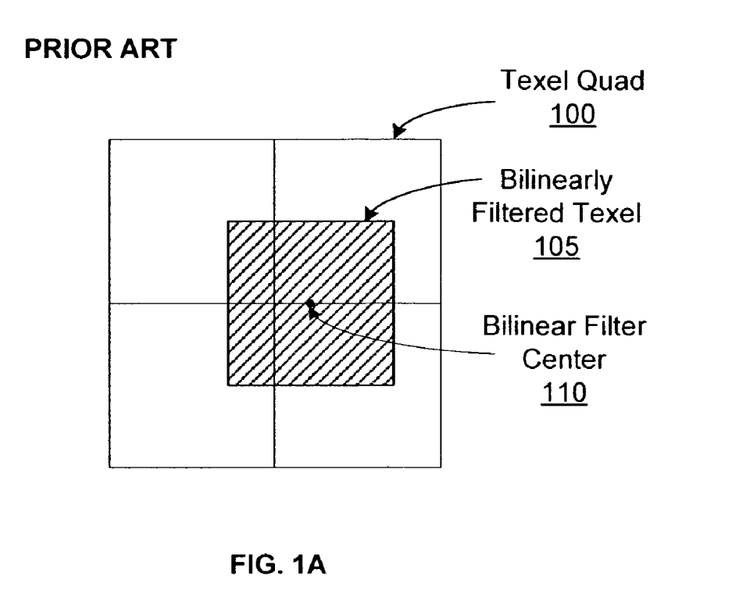
FIG. 1A illustrates a prior art texel quad and a bilinearly filtered texel.
Figure 1B:
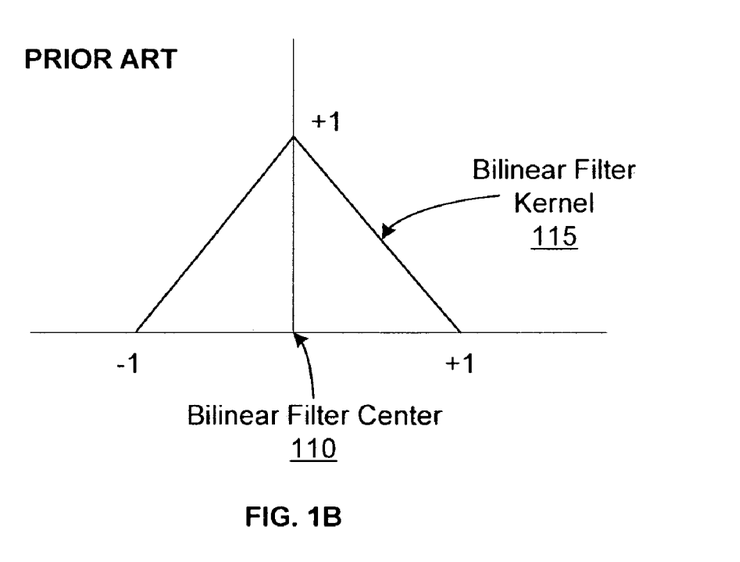
FIG. 1B illustrates a prior art bilinear filter kernel used to produce the bilinearly filtered texel of FIG. 1A.

FIG. 1A illustrates a prior art texel quad, texel quad 100, and a bilinearly filtered texel, bilinearly filtered texel 105. A bilinear filter center 110 corresponds to the texture coordinates. Each of the four texels in texel quad 100 is read and weighted based on the fractional portions of the texture coordinates to produce bilinearly filtered texel 105. FIG. 1B illustrates a prior art bilinear filter kernel, bilinear filter kernel 115, that is used to produce bilinearly filtered texel 105 of FIG. 1A. Biliner filter kernel 115 is symmetric in the horizontal and vertical directions and each texel within texel quad 100 is weighted according to bilinear filter kernel 115, using techniques known to those skilled in the art.

Accordingly, there is a desire for greater flexibility in producing a filtered texel, including a desire to provide explicit texel weights that are not based on the fractional portions of the texture coordinates.

SUMMARY OF THE INVENTION

The current invention involves new systems and methods for providing explicit weights for texture filtering permits filter weights for each texel to vary for each pixel of a graphics primitive. A different filter kernel (defined by the weights) may be used for each pixel. The weights may be computed or read from a texture map. Because the weights are explicit, the fractional portions of the texture map coordinates that are typically used to determine a bilinearly filtered texel are not used. A single program instruction may be used to provide explicit weights with texture map coordinates. The weights are used to scale texels read based on the integer portions of the texture map coordinates and the scaled texels are then summed to produce a filtered texel for a pixel. Furthermore, a single texture fetch instruction may be used to produce the filtered texel. The single texture fetch instruction receives the integer portion of the texture map coordinates and the explicit weights as operands.

Various embodiments of the invention set forth a method for providing explicit weights for texture filtering include receiving texture map coordinates that each include an integer portion and a fractional portion, obtaining an explicit weight that is independent of the fractional portion, wherein the explicit weight defines a portion of a filter kernel, reading a texel corresponding to the integer portions of the texture map coordinates from a first texture map, and scaling the texel by the explicit weight to produce a weighted texel.

Various embodiments of the invention set forth a system for providing explicit weights for texture filtering include a texture address computation unit, a read interface, a weight register unit, and a texel filter unit. The texture address computation unit is configured to receive texture map coordinates that each include an integer portion and a fractional portion. The read interface is coupled to the texture address computation unit and is configured to read a texel corresponding to the integer portions of the texture map coordinates. The weight register unit is configured to store an explicit weight that is independent of the fractional portion of the texture map coordinates. The texel filter unit is coupled to the weight register unit and is configured to receive the explicit weight and the texel and to scale the texel by the explicit weight to produce a weighted texel.

Various embodiments of the invention include a programmable graphics processor configured filter texels using explicit weights to produce filtered texels.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Conventional texture mapping systems perform bilinear filtering to produce a filtered texel for each fragment of a graphics primitive. The bilinear filter weights are inferred based on the fractional portions of the texture map coordinates, limiting the flexibility of the texture mapping system. Using techniques of the present invention to provide explicit weights for texture filtering, permits filter weights for each texel to vary independent of the texture map coordinates. Therefore, the filtered texels may each be produced using a different filter kernel for each pixel of a graphics primitive. The weights may be computed or read from a texture map. Because the weights are explicit, the fractional portions of the texture map coordinates that are typically used to determine a bilinearly filtered texel are not used. A single texture fetch instruction may be used to provide explicit weights with texture map coordinates. The explicit weights are used to scale texels read based on the integer portions of the texture map coordinates and the scaled texels are then summed to produce the filtered texel for a pixel when the single texture fetch instruction is executed.

Figure 2A:
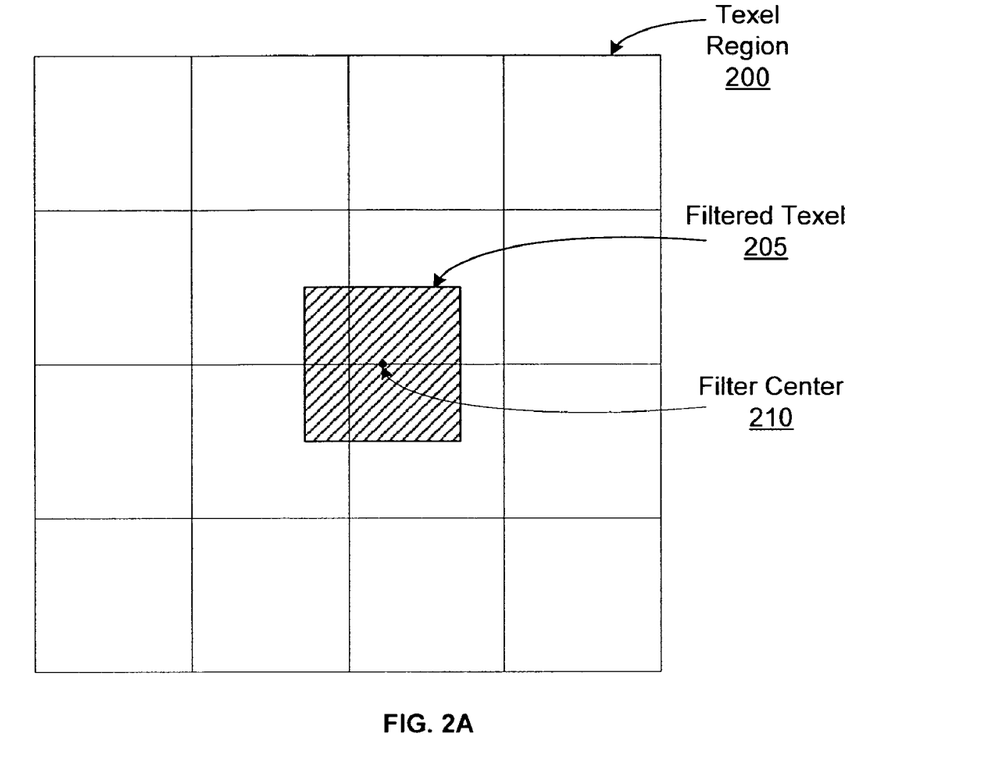
FIG. 2A illustrates a texel region and a filtered texel in accordance with one or more aspects of the present invention.

FIG. 2A illustrates a texel region, texel region 200, and a filtered texel, filtered texel 205, in accordance with one or more aspects of the present invention. Texel region 200 may sized to include one or more texels within a footprint of a filter kernel, where each texel will be scaled by an explicit weight to produce filtered texel 205. Filter center 210 is positioned at the center of filtered texel 205 and corresponds to the texture coordinates. The number of texels within texel region 200 may vary dependent on the filter kernel specified by the explicit weights. In some embodiments of the present invention, four or more texels may be read in a single clock cycle.

Figure 2B:
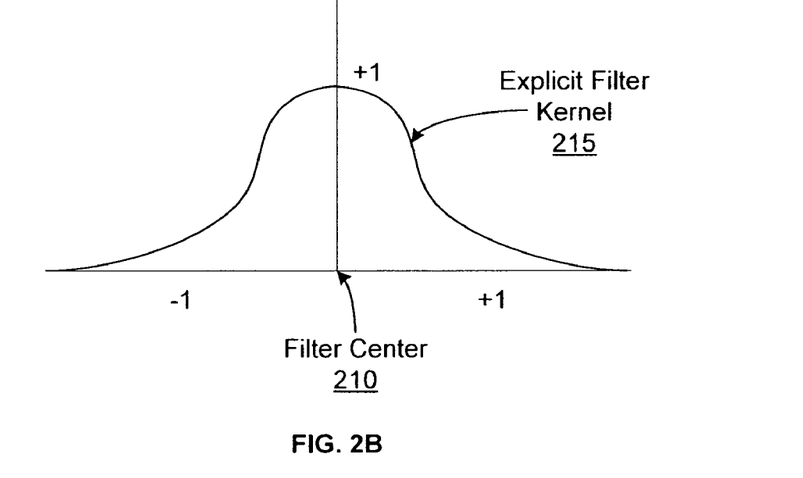
FIGS. 2B and 2C illustrate filter kernels used to produce a filtered texel in accordance with one or more aspects of the present invention.

FIG. 2B illustrates a filter kernel, explicit filter kernel 215, that may be used to produce filtered texel 205 of FIG. 2A, in accordance with one or more aspects of the present invention. Explicit filter kernel 215 is defined by explicit weights. The explicit weights may be stored as a texture map and read using texture coordinates or computed based on a function. The function may be used to compute each texel weight for a particular pixel position. The pixel position corresponds to a fragment to which the filtered texel is applied. In contrast, when conventional bilinear texel filtering is used the weight used to scale each texel is inferred based on the fractional portions of the texture coordinates. Note that a footprint of explicit filter kernel 215 includes more than four texels. Therefore, texel region 200 is larger than a conventional texel quad, such as texel quad 100.

Figure 2C:
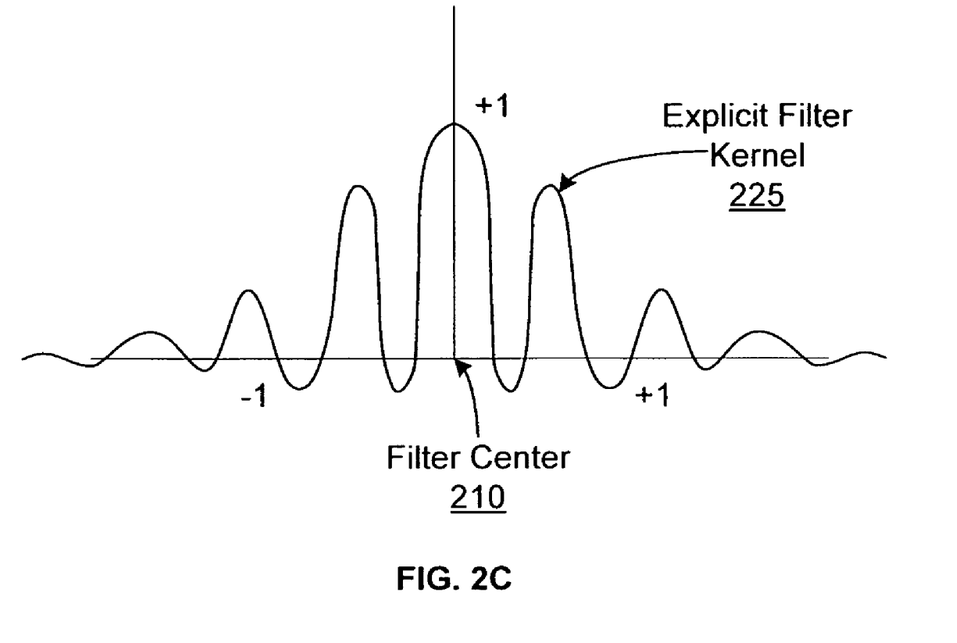

FIG. 2C illustrates another filter kernel, explicit filter kernel 225, that may be used to produce filtered texel 205 of FIG. 2A, in accordance with one or more aspects of the present invention. Like explicit filter kernel 215, explicit filter kernel 225 is also defined by explicit weights that may be stored as a texture map or computed based on a function. Note that explicit filter kernel 225 includes negative weights. A footprint of explicit filter kernel 225 may cover one or more texels, even covering texels outside of texel region 200.

Figure 3A:
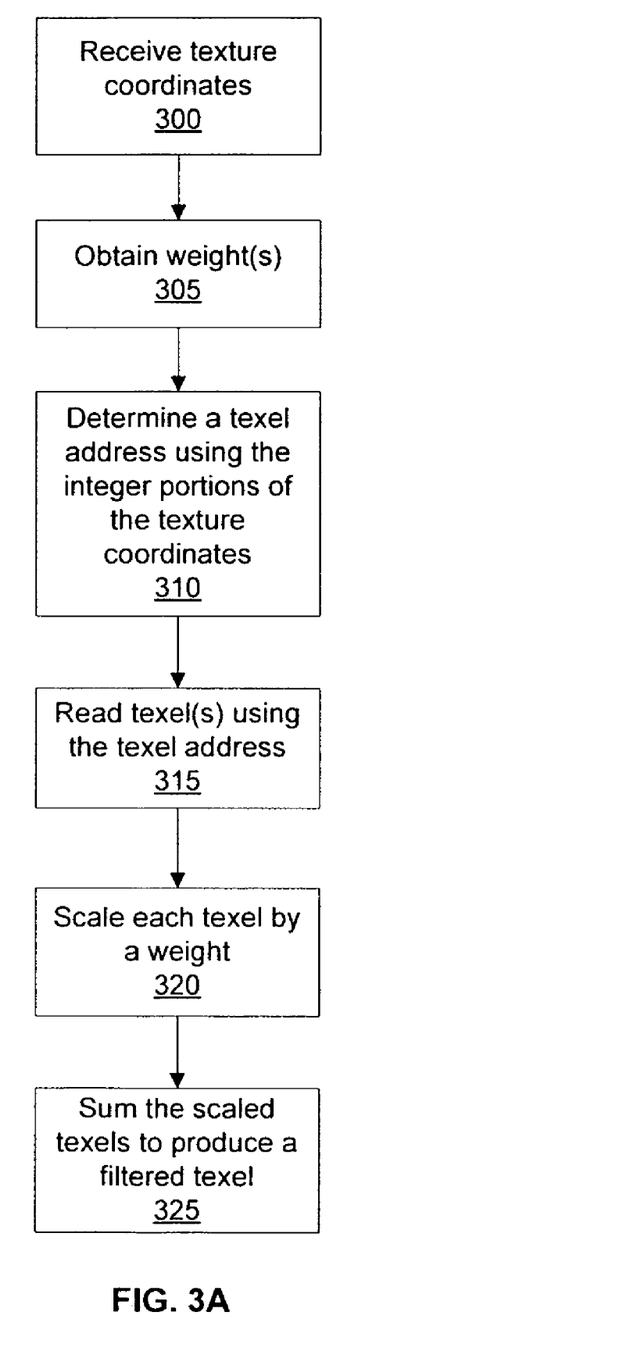
FIG. 3A illustrates an embodiment of a method of producing a filtered texel using explicit weights in accordance with one or more aspects of the present invention.

FIG. 3A illustrates an embodiment of a method of producing a filtered texel, such as filtered texel 205 of FIG. 5A, using explicit weights in accordance with one or more aspects of the present invention. In step 300 texture coordinates are received. The texture coordinates, such as u, v, and p each include an integer portion and a fractional portion. In step 305 explicit weight(s) are received. The explicit weights may be read from a texture map using the texture coordinates, as described in conjunction with FIG. 3B, or computed based on a pixel position, as described in conjunction with FIG. 3C.

In step 310 a texel address is determined using techniques known to those skilled in the art. Conventionally, the texel address is determined using only the integer portions of the texture coordinates. In some embodiments of the present invention, additional texel addresses may be determined in order to read all of the texels covered by an explicit filter kernel footprint, such as the footprint of explicit filter kernel 215 or 225. In step 315 one or more texels are read using the texel address. In step 320 each texel that is covered by the explicit filter kernel footprint is scaled by a weight obtained in step 305 to produce scaled texels. In step 325 the scaled texels are summed to produce a filtered texel. Steps 320 and 325 are used to compute the filtered texel using the following equation:

$$\Sigma = T_i * W_i,$$

where i ranges in value from 0 to n, and n is the number of texels covered by the footprint of the explicit filter kernel. $T_i$ is a texel covered by the footprint of the explicit filter kernel and $W_i$ is an explicit weight corresponding to the texel. The method shown in FIG. 3A may be used to perform convolution operations to produce a filtered texel.

Figure 3B:
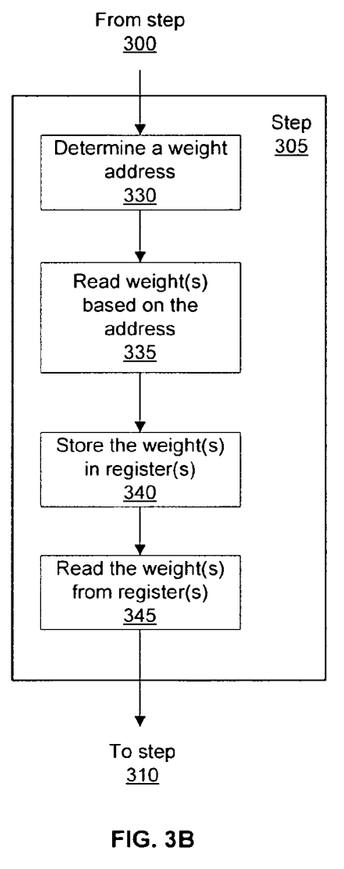
FIG. 3B illustrates an embodiment of a method of performing the step of obtaining the explicit weights of FIG. 3A in accordance with one or more aspects of the present invention.

FIG. 3B illustrates an embodiment of a method of performing step 305 of FIG. 3A in accordance with one or more aspects of the present invention. In particular, FIG. 3B illustrates a method for obtaining the explicit weights by reading them from a texture map. In step 330 an address is determined that corresponds to one or more explicit weights. The address may be determined using the integer portions of the texture map coordinates received in step 300 or using other texture map coordinates. In step 335 one or more explicit weights are read from the texture map using the address that was determined in step 330. In step 340 the explicit weights are stored in one or more registers. In some embodiments of the present invention, each weight is 4 bits and 8 weights are stored in a 32 bit register that may be read using a single texture fetch instruction. The single texture fetch instruction may also read 8 texels using the texture address determined in step 310.

In step 345 the explicit weights are read from the one or more registers and used to scale the texels. Storing the explicit weights permits the explicit weights to be read many clock cycles earlier than the texels that are read in step 315. For example, a single texture fetch instruction may be used to read N texels from a texture map, read N explicit weights from a register, scale each texel by a corresponding explicit weight, and sum the scaled texels to produce the filtered texel. In some embodiments of the present invention, steps 340 and 345 are omitted and the explicit weights are used to scale the texels immediately after being read from the texture map.

Figure 3C:
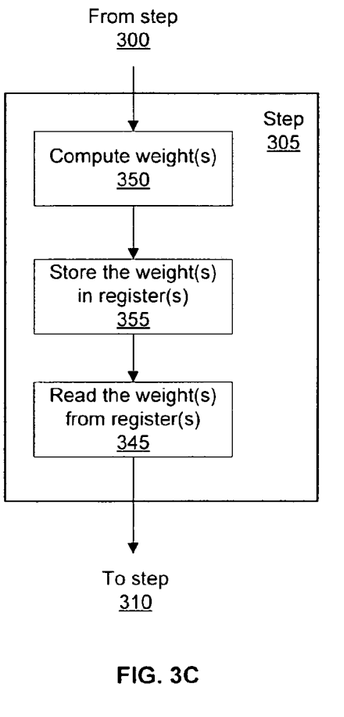
FIG. 3C illustrates another embodiment of a method of performing the step of obtaining the explicit weights of FIG. 3A in accordance with one or more aspects of the present invention.

FIG. 3C illustrates another embodiment of a method of performing step 305 of FIG. 3A in accordance with one or more aspects of the present invention. In particular, FIG. 3C illustrates a method for obtaining the explicit weights by computing them. In step 350 one or more explicit weights are computed. The explicit weights may be computed using a function that is based on a pixel position. For example, explicit weights defining explicit filter kernels 215 and 225 may be produced by evaluating a function for various pixel positions.

In step 355 the explicit weights computed in step 350 are stored in one or more registers. In some embodiments of the present invention, the explicit weights computed in step 350 are stored as texels in a texture map. The texels may be read from the texture map and used to produce a filtered texel, to complete step 305 of FIG. 3A. In step 345 the explicit weights are read from the one or more registers and used to scale the texels. Storing the explicit weights permits the explicit weights to be read many clock cycles earlier than the texels that are read in step 315. In some embodiments of the present invention, steps 355 and 345 are omitted and the explicit weights are used to scale the texels immediately after being read from the texture map.

Figure 4:
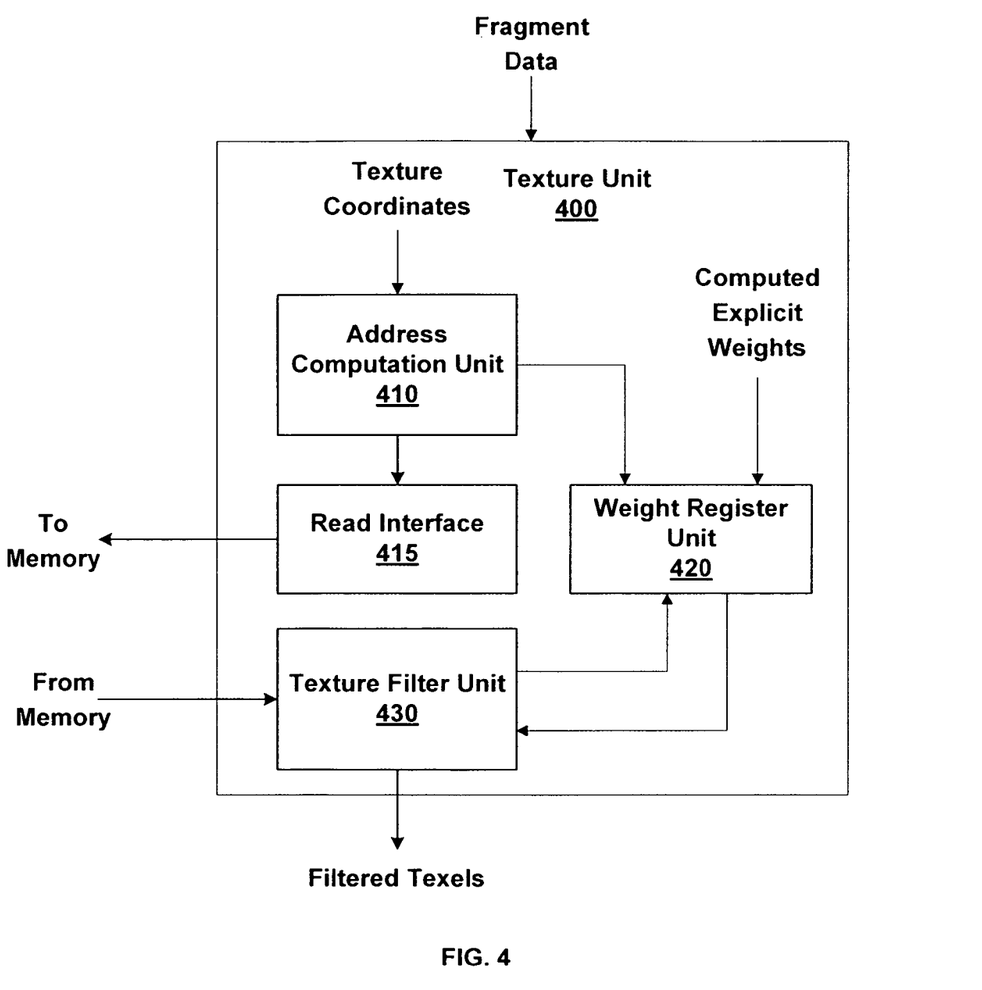
FIG. 4 is a block diagram of a portion of a texture unit including a weight register unit in accordance with one or more aspects of the present invention.

FIG. 4 is a block diagram of a portion of a texture unit, texture unit 400 that includes a weight register unit, weight register unit 420, in accordance with one or more aspects of the present invention. In some embodiments, texture unit 400 receives fragment data from a rasterizer, e.g., program instructions, and parameters associated with fragments, e.g., texture identifiers, texture coordinates, and the like. A fragment is formed by the intersection of a pixel and a primitive. Primitives include geometry, such as points, lines, triangles, quadrilaterals, meshes, surfaces, and the like. A fragment may cover a pixel or a portion of a pixel. Likewise, a pixel may include one or more fragments and each fragment may correspond to one or more sets of texture coordinates.

Texture Unit 400 may include computation units (not shown) configured to determine level of detail texture map values for a mip mapped texture map and unnormalized texture map coordinates using techniques known to those skilled in the art. An address computation unit 410 receives texture coordinates and computes an address corresponding to one or more texels. Address computation unit 410 may be configured to perform steps 300 and 310 of FIG. 3A and step 330 of FIG. 3B. Address computation unit 410 outputs the computed address to a read interface unit 415. Read interface 415 outputs the addresses and a read request to a memory, e.g., cache, RAM, ROM, or the like. Read interface 415 may be configured to perform step 315 of FIG. 3A and step 335 of FIG. 3B. Texels read from memory are received from the memory by a texture filter unit 430. In some embodiments of the present invention, the texels are explicit weights read from a texture map and those texels are output to weight register unit 420 for storage. In some embodiments of the present invention, read interface 415 may include a texel cache memory that is configured to store texels.

Weight register unit 420 receives and stores explicit weights that may be included in the fragment data, computed within texture unit 400, or read from a texture map via read interface 415. Weight register unit 420 may be configured to perform steps 340 and 345 of FIG. 3B and steps 355 and 345 of FIG. 3C. In some embodiments of the present invention, particularly those that support conventional using bilinear interpolation to produce a filtered texel value, address computation unit 410 computes bilinear weights using the fractional portions of the texture map coordinates and outputs those bilinear weights to weight register unit 420 for storage. Weight register unit 420 outputs the explicit weights to a texture filter unit 430.

Texture filter unit 430 receives the explicit weights from weight register unit 420 and the texels read from memory. Texture filter unit 430 may be configured to perform steps 320 and 325 of FIG. 3A. Texture filter unit 430 scales the texels using the explicit weights to produce scaled texels, sums the scaled texels to produce a filtered texel, and outputs the filtered texel. The filtered texels are output to a shader unit, described further herein, to compute a color for each fragment.

Figure 5:
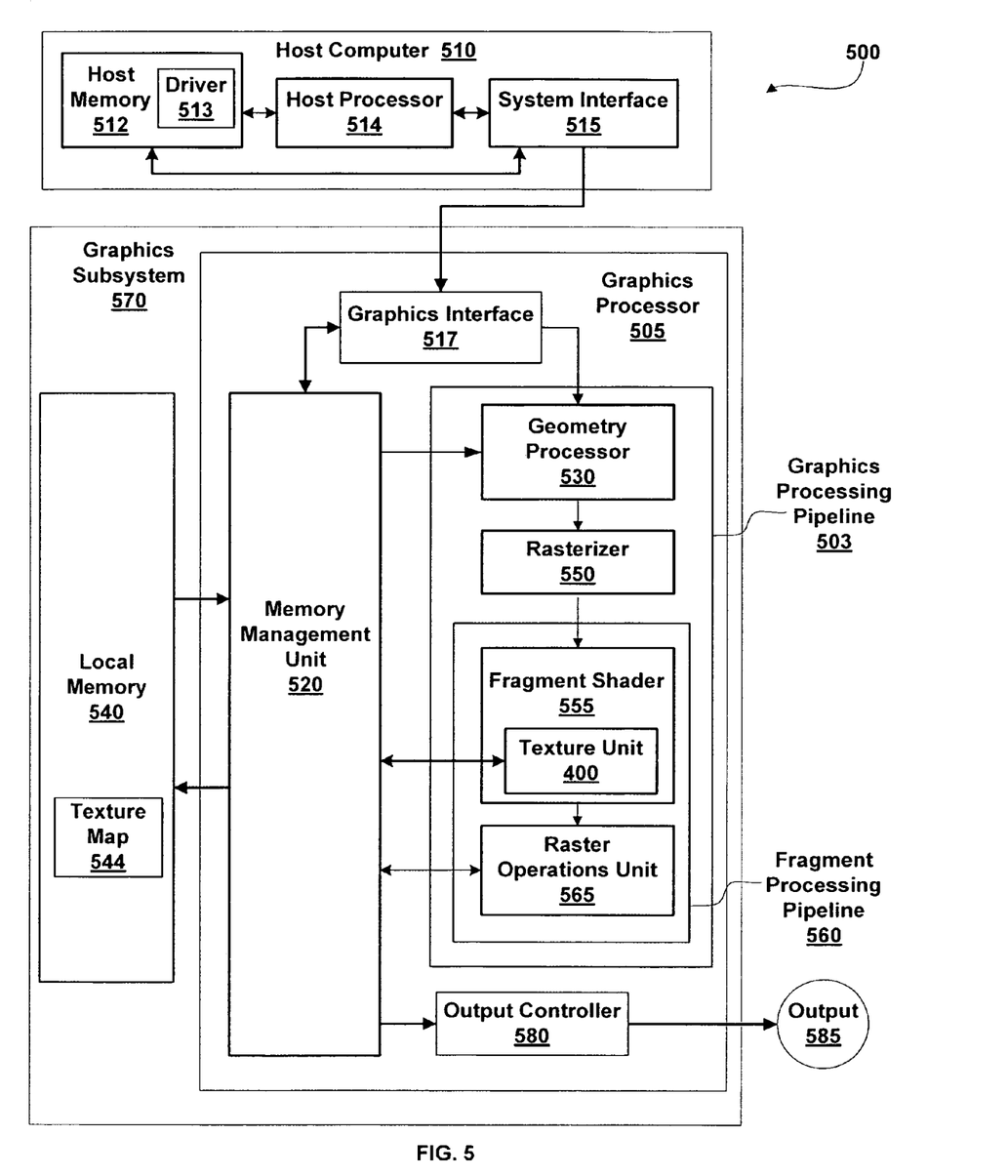
FIG. 5 is a block diagram of an exemplary embodiment of a respective computer system in accordance with one or more aspects of the present invention including a host computer and a graphics subsystem.

FIG. 5 is a block diagram of an exemplary embodiment of a respective computer system, generally designated 500, and including a host computer 510 and a graphics subsystem 507 in accordance with one or more aspects of the present invention. The methods described in conjunction with FIGS. 3A, 3B, and 3C may be performed using host computer 510 and graphics subsystem 507. Computing system 500 may be a desktop computer, server, laptop computer, palm-sized computer, tablet computer, game console, portable wireless terminal such as a PDA or cellular telephone, computer based simulator, or the like. Host computer 510 includes host processor 514 that may include a system memory controller to interface directly to host memory 512 or may communicate with host memory 512 through a system interface 515. System interface 515 may be an I/O (input/output) interface or a bridge device including the system memory controller to interface directly to host memory 512. An example of system interface 515 known in the art includes Intel® Northbridge.

A graphics device driver, driver 513, interfaces between processes executed by host processor 514, such as application programs, and a programmable graphics processor 505, translating program instructions as needed for execution by programmable graphics processor 505. Driver 513 also uses commands to configure sub-units within programmable graphics processor 505. Specifically, driver 513 may provide programmable graphics processor 505 with graphics primitives for processing or texture data for storage in a local memory 540, produced by host processor 514.

Graphics subsystem 507 includes local memory 540 and programmable graphics processor 505. Host computer 510 communicates with graphics subsystem 570 via system interface 515 and a graphics interface 517 within programmable graphics processor 505. Data, program instructions, and commands received at graphics interface 517 can be passed to a graphics processing pipeline 503 or written to a local memory 540 through memory management unit 520. Programmable graphics processor 505 uses memory to store graphics data, including texture maps, and program instructions, where graphics data is any data that is input to or output from computation units within programmable graphics processor 505. Graphics memory is any memory used to store graphics data, including render targets, or program instructions to be executed by programmable graphics processor 505. Graphics memory can include portions of host memory 512, local memory 540 directly coupled to programmable graphics processor 505, storage resources coupled to the computation units within programmable graphics processor 505, and the like. Storage resources can include register files, caches, FIFOs (first in first out memories), and the like.

In addition to Interface 517, programmable graphics processor 505 includes a graphics processing pipeline 503, a memory management unit 520 and an output controller 580. Data and program instructions received at interface 517 can be passed to a geometry processor 530 within graphics processing pipeline 503 or written to local memory 540 through memory management unit 520. In addition to communicating with local memory 540 and interface 517, memory management unit 520 also communicates with graphics processing pipeline 503 and output controller 580 through read and write interfaces in graphics processing pipeline 503 and a read interface in output controller 580.

Within graphics processing pipeline 503, geometry processor 530 and a programmable graphics fragment processing pipeline, fragment processing pipeline 560, perform a variety of computational functions. Some of these functions are table lookup, scalar and vector addition, multiplication, division, coordinate-system mapping, calculation of vector normals, tessellation, calculation of derivatives, interpolation, filtering, and the like. Geometry processor 530 and fragment processing pipeline 560 are optionally configured such that data processing operations are performed in multiple passes through graphics processing pipeline 503 or in multiple passes through fragment processing pipeline 560. For example, explicit weights may be computed during a first pass through fragment processing pipeline 560 and the computed explicit weights may be stored as texels in a texture map. The explicit weights may then be read in a second pass through fragment processing pipeline 560 and used to produce a filtered texel. Each pass through programmable graphics processor 505, graphics processing pipeline 503 or fragment processing pipeline 560 concludes with optional processing by a raster operations unit 565.

Vertex programs are sequences of vertex program instructions compiled by host processor 514 for execution within geometry processor 530 and rasterizer 550. Shader programs are sequences of shader program instructions compiled by host processor 514 for execution within fragment processing pipeline 560. Geometry processor 530 receives a stream of program instructions (vertex program instructions and shader program instructions) and data from interface 517 or memory management unit 520, and performs vector floating-point operations or other processing operations using the data. The program instructions configure subunits within geometry processor 530, rasterizer 550 and fragment processing pipeline 560. The program instructions and data are stored in graphics memory, e.g., portions of host memory 512, local memory 540, or storage resources within programmable graphics processor 505. When a portion of host memory 512 is used to store program instructions and data the portion of host memory 512 can be uncached so as to increase performance of access by programmable graphics processor 505. Alternatively, configuration information is written to registers within geometry processor 530, rasterizer 550 and fragment processing pipeline 560 using program instructions, encoded with the data, or the like.

Data processed by geometry processor 530 and program instructions are passed from geometry processor 530 to a rasterizer 550. Rasterizer 550 is a sampling unit that processes primitives and generates sub-primitive data, such as fragment data, including parameters associated with fragments (texture identifiers, texture coordinates, sub-pixel coverage, explicit weights, and the like). Rasterizer 550 converts the primitives into sub-primitive data by performing scan conversion on the data processed by geometry processor 530. Rasterizer 550 outputs fragment data and shader program instructions to fragment processing pipeline 560.

The shader programs configure the fragment processing pipeline 560 to process fragment data by specifying computations and computation precision. Fragment shader 555 is optionally configured by shader program instructions such that fragment data processing operations are performed in multiple passes within fragment shader 555. Fragment shader 555 may include a texture unit 400 that reads from texture maps stored in graphics memory, such as texture map 544. Texture map 544 may be used to store explicit weights, as described in conjunction with FIGS. 3B and 3C.

Texture map data may also be applied to the fragment data using techniques known to those skilled in the art to produce shaded fragment data. The texture data may be produced by graphics processor 505 and stored in graphics memory for use during the processing of fragment data. For example, a function may be evaluated to compute explicit weights defining an explicit filter kernel and the explicit weights may be stored in memory and read by texture unit 400. In other embodiments of the present invention, fragment shader 555 may be configured to compute each explicit weight according to a shader program and provide the explicit weights to texture unit 400.

Fragment shader 555 outputs the shaded fragment data, e.g., color, depth, and codewords generated from shader program instructions to raster operations unit 565. Raster operations unit 565 includes a read interface and a write interface to memory management unit 520 through which raster operations unit 565 accesses data stored in local memory 540 or host memory 512. Raster operations unit 565 optionally performs near and far plane clipping and raster operations, such as stencil, z test, alpha blending, and the like, using the fragment data and pixel data stored in local memory 540 or host memory 512 at a pixel position (image location specified by x,y coordinates) associated with the processed fragment data.

Raster operations unit 565 may be configured to write explicit weights into a texture map. The output data from raster operations unit 565 is written back to local memory 540 or host memory 512 at the pixel position associated with the output data and the results, e.g., explicit weights, image data, or the like are saved in a render target, e.g., texture map, image buffer, or the like, stored in graphics memory.

When processing is completed, an output 585 of graphics subsystem 507 is provided using output controller 580. Alternatively, host processor 514 reads the image stored in local memory 540 through memory management unit 520, interface 517 and system interface 515. Output controller 580 is optionally configured by opcodes to deliver data to a display device, network, electronic control system, other computing system 500, other graphics subsystem 507, or the like.

Using techniques of the present invention to provide explicit weights for texture filtering, permits filter weights for each texel to vary independent of the texture map coordinates. In particular, the explicit filter weights are independent of the fractional portions of the texture map coordinates. The explicit weights may be computed or read from a texture map. A single texture fetch instruction may be used to provide explicit weights and a texture map address corresponding to one or more texels. The explicit weights are used to scale the one or more texels and the scaled texels are then summed to produce the filtered texel for a pixel when the single texture fetch instruction is executed.

The invention has been described above with reference to specific embodiments. Persons skilled in the art will recognize, however, that various modifications and changes may be made thereto without departing from the broader spirit and scope of the invention as set forth in the appended claims. For example, in alternative embodiments, the method set forth herein may be implemented either partially or entirely in a software program or a fragment program executed by fragment shader 555. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A computer-implemented method of providing explicit weights corresponding to texels, comprising:
   receiving, at a texture unit in a graphics processing pipeline, texture map coordinates that each include an integer portion and a fractional portion;
   obtaining an explicit weight that is independent of the fractional portion, wherein the explicit weight defines a portion of a filter kernel;
   reading a texel corresponding to the integer portions of the texture map coordinates from a first texture map; and
   scaling the texel by the explicit weight to produce a weighted texel.

2. The method of claim 1, wherein the receiving, obtaining, reading, and scaling are repeated to produce additional weighted texels.

3. The method of claim 2, further comprising summing the weighted texel with the additional weighted texels to produce a filtered texel.

4. The method of claim 1, wherein the obtaining comprises computing the explicit weight using a shader program.

5. The method of claim 4, wherein the explicit weight is computed based on a pixel position of a fragment corresponding to the texture map coordinates.

6. The method of claim 1, wherein the obtaining comprises reading the explicit weight from a second texture map.

7. The method of claim 6, wherein the explicit weight is read from the second texture map using the texture map coordinates.

8. The method of claim 1, wherein the obtaining comprises reading the explicit weight from a register.

9. The method of claim 8, wherein the register is provided as a first operand to a texture map fetch instruction and the texture map coordinates are provided as a second operand to the texture map fetch instruction.

10. The method of claim 9, wherein the texture map fetch instruction reads eight texels from the first texture map and the register provides eight explicit weights that define at least a portion of the filter kernel.

11. A system for providing explicit weights corresponding to texels, comprising:
   a texture address computation unit configured to receive texture map coordinates that each include an integer portion and a fractional portion;
   a read interface coupled to the texture address computation unit and configured to read a texel corresponding to the integer portions of the texture map coordinates;
   a weight register unit configured to store an explicit weight that is independent of the fractional portion of the texture map coordinates; and
   a texel filter unit coupled to the weight register unit and configured to receive the explicit weight and the texel and to scale the texel by the explicit weight to produce a weighted texel.

12. The system of claim 11, wherein the read interface is configured to read additional texels corresponding to the integer portions of the texture map coordinates and the texture filter unit is configured to receive additional explicit weights and to scale each one of the additional texels by a corresponding one of the additional explicit weights to produce additional weighted texels.

13. The system of claim 12, wherein the texture filter unit is configured to sum the weighted texel with the additional weighted texels to produce a filtered texel.

14. The system of claim 13, further comprising a fragment shader configured to produce a shaded fragment using the filtered texel.

15. The system of claim 11, further comprising a fragment shader configured to compute the explicit weight by executing a shader program.

16. The system of claim 15, wherein the explicit weight is computed based on a pixel position of a fragment corresponding to the texture map coordinates.

17. The system of claim 15, wherein the explicit weight is stored as a texel in a second texture map.

18. The system of claim 11, wherein the read interface is configured to read the explicit weight from a second texture map.

19. The system of claim 17, wherein the texture address computation unit is configured to determine an address for the second texture map using the texture map coordinates.

20. The system of claim 11, wherein texture map coordinates correspond to a three-dimensional texture map and the address computation unit is configured to produce an address for the three-dimensional texture map.

\* \* \* \* \*